(12) United States Patent
Takebayashi

(10) Patent No.: US 12,441,095 B2
(45) Date of Patent: Oct. 14, 2025

(54) DAM FORMING METHOD AND METHOD FOR MANUFACTURING LAMINATE

(71) Applicant: DEXERIALS CORPORATION, Shimotsuke (JP)

(72) Inventor: Yuko Takebayashi, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 533 days.

(21) Appl. No.: 17/642,327

(22) PCT Filed: Sep. 14, 2020

(86) PCT No.: PCT/JP2020/034683
§ 371 (c)(1),
(2) Date: Mar. 11, 2022

(87) PCT Pub. No.: WO2021/054282
PCT Pub. Date: Mar. 25, 2021

(65) Prior Publication Data
US 2022/0332104 A1    Oct. 20, 2022

(30) Foreign Application Priority Data

Sep. 17, 2019    (JP) .................. 2019-168257

(51) Int. Cl.
*B32B 37/12*    (2006.01)
*B32B 7/12*    (2006.01)

(52) U.S. Cl.
CPC ............ *B32B 37/1284* (2013.01); *B32B 7/12* (2013.01); *B32B 2037/1253* (2013.01);
(Continued)

(58) Field of Classification Search
None
See application file for complete search history.

(56) References Cited

U.S. PATENT DOCUMENTS

2015/0293397 A1* 10/2015 Ogawa ................ B32B 37/1284
118/323

FOREIGN PATENT DOCUMENTS

CN    104335269 A    2/2015
CN    104936778 A    9/2015
(Continued)

OTHER PUBLICATIONS

WO2018159110A1_machine_translation (Year: 2018).*
(Continued)

*Primary Examiner* — Michael N Orlando
*Assistant Examiner* — Abhishek A Patwardhan
(74) *Attorney, Agent, or Firm* — Oliff PLC

(57) ABSTRACT

A dam forming method and a method for manufacturing a laminate capable of suppressing the occurrence of a height difference in the thickness of a dam. A dam forming method is used in a method for manufacturing a laminate in which a first base member and a second base member are laminated via a fill material, including: forming a dam surrounding an application region for the fill material on the first base member; and applying the fill material to the application region. The dam forming method includes: applying a dam-forming resin composition on peripheral edges of the first base member by accelerating the application speed of the dam-forming resin composition continuously or stepwise from the start to the end of the application; and curing the applied dam-forming resin composition.

20 Claims, 10 Drawing Sheets

(52) U.S. Cl.
CPC . *B32B 2307/412* (2013.01); *B32B 2310/0831* (2013.01); *B32B 2457/20* (2013.01)

(56) References Cited

FOREIGN PATENT DOCUMENTS

| | | | |
|---|---|---|---|
| JP | 2003-124401 A | 4/2003 | |
| JP | 2012-230808 A | 11/2012 | |
| JP | 2013-59751 A | 4/2013 | |
| JP | 2013-88455 A | 5/2013 | |
| JP | 5587519 B1 | 9/2014 | |
| JP | 2016-87529 A | 5/2016 | |
| JP | 2017-161939 A | 9/2017 | |
| KR | 10-2018-0038576 A | 4/2018 | |
| WO | 2011/155396 A1 | 12/2011 | |
| WO | 2014/054592 A1 | 4/2014 | |
| WO | 2014/104231 A1 | 7/2014 | |
| WO | WO-2018159110 A1 * | 9/2018 | ............. B32B 37/12 |

OTHER PUBLICATIONS

Nov. 17, 2020 International Search Report issued in International Patent Application No. PCT/JP2020/034683.
Feb. 6, 2024 Office Action issued in Korean Patent Application No. 10-2022-7007619.
Jan. 31, 2024 Office Action issued in Taiwanese Patent Application No. 109131853.
Jul. 26, 2023 Chinese Office Action issued in Chinese Patent Application No. 202080063442.4.
Sep. 16, 2022 Office Action Issued in Chinese Patent Application No. 202080063442.4.
"Adhesive Technology and Application Manual," 1st Edition, Chief Editor Li Kinbayashi, p. 670, Dec. 31, 1991.
Oct. 18, 2023 Official Communication issued in European Patent Application No. 20865670.2.

* cited by examiner

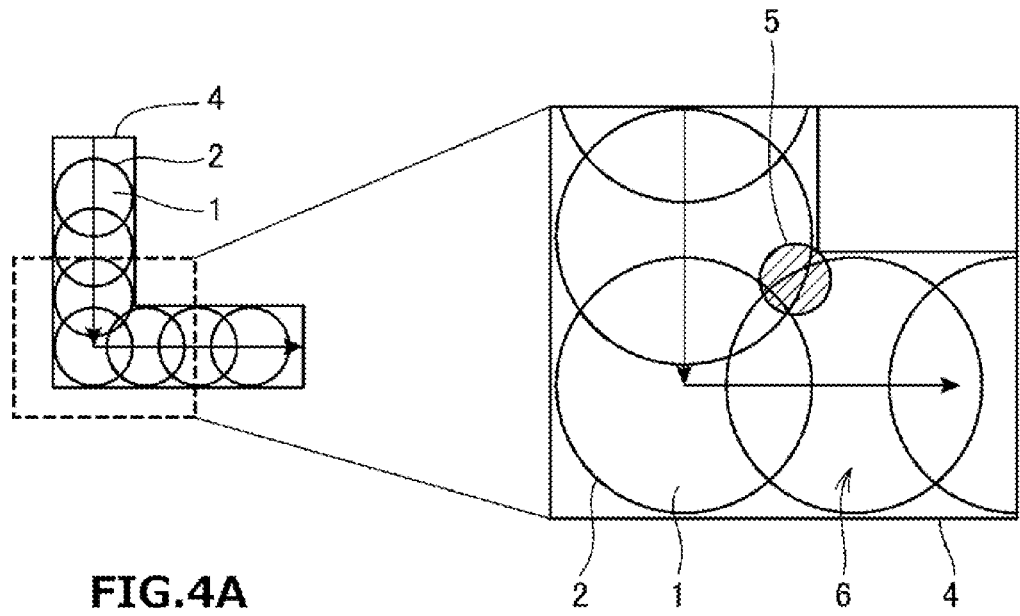
FIG.4A
FIG.4B
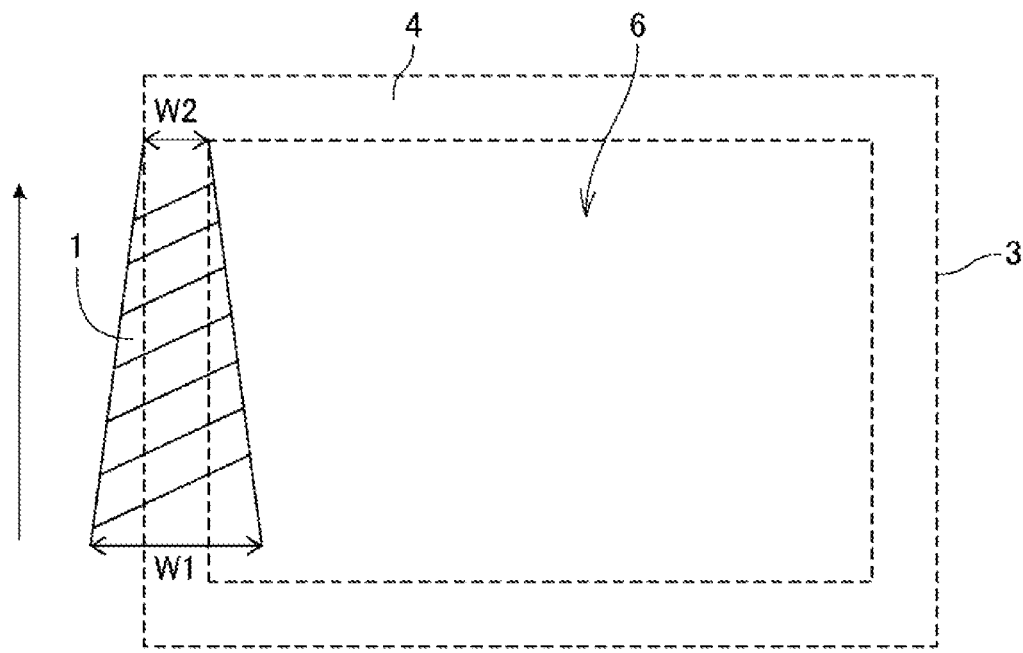
FIG.5

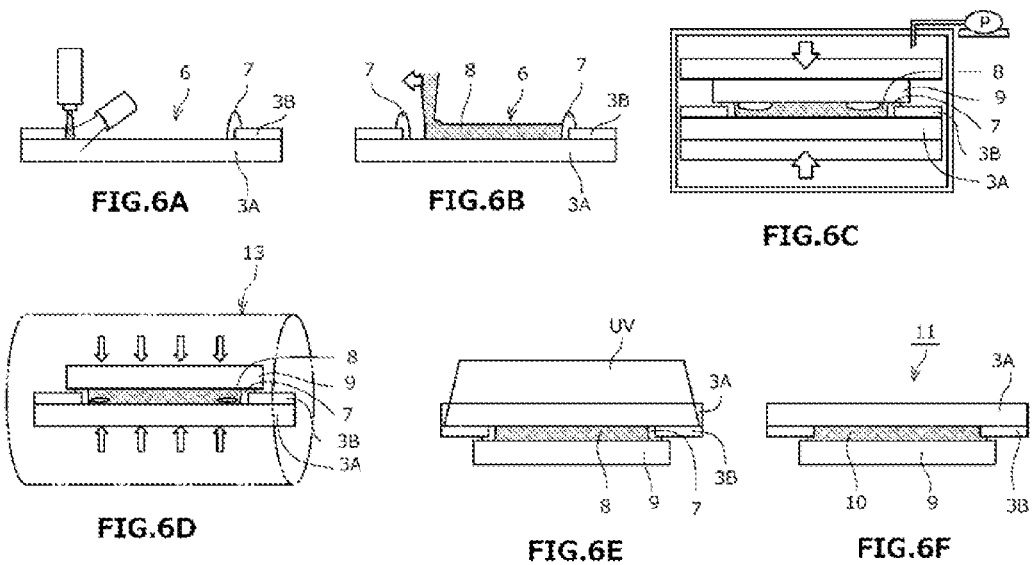
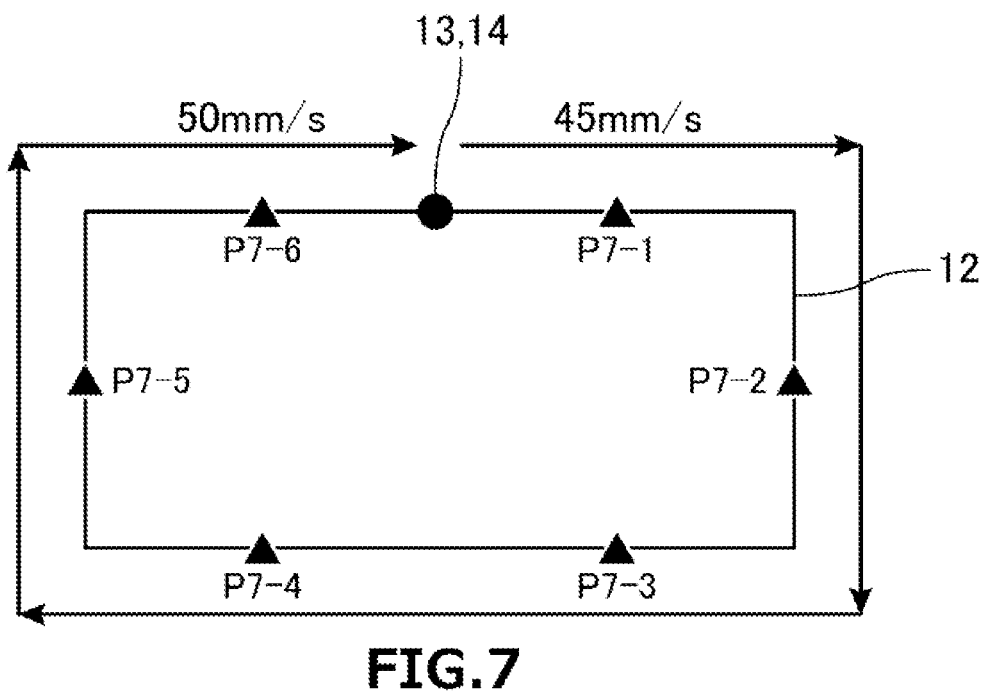

DAM FORMING METHOD AND METHOD FOR MANUFACTURING LAMINATE

TECHNICAL FIELD

The present technology relates to a dam forming method and a method for manufacturing a laminate. This application claims priority based on Japanese Patent Application No. 2019-168257, filed Sep. 17, 2019 in Japan, which is incorporated by reference in this application.

BACKGROUND ART

Conventionally, in optical devices such as liquid crystal display devices used in information terminals such as smartphones or car navigation devices, a light-transmissive cured resin layer is provided between an optical member such as a liquid crystal display panel and a transparent panel for protecting the optical member for the purpose of thinning the device and improving visibility.

In manufacture of an optical device, when applying a resin composition (hereinafter referred to as a fill material) for forming a cured resin layer to a base member (an optical member or a transparent panel), the applied fill material may undesirably protrude from the base member due to its fluidity. A method of solving this problem includes forming a dam (wall) surrounding the application region for the fill material on the surface of the base member, and applying the fill material to the application region inside the dam to prevent the fill material from protruding.

In the formation of a dam, as shown in FIG. 9, when a dam-forming resin composition 100 for forming the dam is applied to a base member 102 from a nozzle 101 of an application device, the dam-forming resin composition 100 may become wet and spread with time, which might reduce the thickness (height) of the dam. This decrease in the thickness of the dam with time might cause a height difference in a single dam. The height difference in a dam is proportional to the length of the dam and the thickness of the dam. If this height difference occurs in the dam, when the base members (first base member 102A, 102B) are laminated to each other via a fill material 103, an unbonded region 104 may occur as shown in FIG. 10, or the thickness of the fill material 103 after laminating may become uneven as shown in FIG. 11.

A method for suppressing the occurrence of the height difference in the dam includes, as shown in FIG. 12 for example, using a resin composition 105 having a thixotropic property as the dam-forming resin composition 100 to suppress the wetting and spreading of the resin composition with time so as to maintain the thickness (shape) of the dam (see, e.g., Patent Documents 1 and 2). The arrow in FIG. 12 indicates the moving direction of the nozzle 101. For example, when discharged from the nozzle, the thixotropic resin composition has a low viscosity due to shearing stress, and returns to the original viscosity after discharge (in a state where no shearing stress is applied), so that the shape after discharge tends not to collapse.

Another method for suppressing the occurrence of the height difference in the dam includes, as shown in FIG. 13 for example, preparing a UV irradiator such as a spot UV irradiator 106 and causing the spot UV irradiator 106 to track the nozzle 101 at the same trajectory and speed as the nozzle 101 while applying the dam-forming resin composition 100 from the nozzle 101 to the base member 102. The arrow in FIG. 13 indicates the moving direction of the nozzle 101 and the spot UV irradiator 106. In this method, the thickness (shape) of the dam is maintained by simultaneously irradiating UV light while applying the dam-forming resin composition 100.

However, since the method of forming the dam using the resin composition 105 having the thixotropic property requires the use of the thixotropic resin composition 105, it might be impossible to achieve the characteristics (e.g., hardness, elastic modulus, adhesion, and defoaming property, among others) required for the dam. Further, the material cost of the thixotropic resin composition 105 tends to be expensive.

In the dam forming method using the spot UV irradiator 106, the application speed of the dam-forming resin composition 100 should be reduced in order to secure the UV irradiation amount for maintaining the shape of the dam-forming resin composition 100 immediately after the application, which increases the tact time. Further, the dam forming method using the spot UV irradiator 106 will increase the cost of equipment.

CITATION LIST

Patent Literature

Patent Document 1: Japanese Patent No. 5587519
Patent Document 2: Japanese Unexamined Patent Application Publication No. 2013-88455

SUMMARY OF INVENTION

Technical Problem

The present technology has been proposed in view of such conventional circumstances, and provides a dam forming method and a method for manufacturing a laminate capable of suppressing the occurrence of a height difference in the thickness of a dam.

Solution to Problem

A dam forming method according to the present technology is used in a method for manufacturing a laminate in which a first base member and a second base member are laminated via a fill material, including: forming a dam surrounding an application region for the fill material on the first base member; and applying the fill material to the application region, the dam forming method including: applying a dam-forming resin composition for forming the dam on peripheral edges of the first base member by accelerating the application speed of the dam-forming resin composition continuously or stepwise from the start to the end of the application; and curing the applied dam-forming resin composition.

A method for manufacturing a laminate according to the present technology includes: Step A of forming a dam surrounding an application region for a fill material on a first base member; Step B of applying the fill material to the application region; Step C of laminating the first base member and the second base member via the fill material; and Step D of forming a cured resin layer by curing the fill material; wherein the dam is formed in Step A by applying a dam-forming resin composition for forming the dam on peripheral edges of the first base member by accelerating the application speed of the dam-forming resin composition continuously or stepwise from the start to the end of the application; and curing the applied dam-forming resin composition.

Advantageous Effects of Invention

The present technology can suppress the occurrence of a height difference in the thickness of a dam.

BRIEF DESCRIPTION OF DRAWINGS

FIG. 4A is a plan view illustrating an example of moving positions of a nozzle when the application direction of the dam-forming resin composition is changed, and FIG. 4B is an enlarged plan view of the broken line box of FIG. 4A.

FIG. 5 is a plan view for explaining an example of a method for accelerating the application speed of a dam-forming resin composition continuously or stepwise from the start to the end of the application.

FIGS. 6A to 6F are cross-sectional views for explaining a method for manufacturing an optical device, in which FIG. 6A illustrates a step of forming a dam surrounding an application region for a fill material on a transparent panel, FIG. 6B illustrates a step of applying the fill material to the application region for the fill material, FIG. 6C illustrates a step of vacuum laminating the transparent panel and the optical member via the fill material to form a laminate, FIG. 6D is a step of performing pressure defoaming treatment on the laminate using an autoclave, FIG. 6E illustrates a step of irradiating the fill material layer sandwiched between the optical member and the transparent panel with ultraviolet light to form a cured resin layer, and FIG. 6F is a cross-sectional view illustrating the formed optical device.

FIG. 7 is a plan view for explaining the dam forming method in Example 1.

DESCRIPTION OF EMBODIMENTS

Dam Forming Method

A dam forming method according to the present technology is used in a method for manufacturing a laminate in which a first base member and a second base member are laminated via a fill material, including: forming a dam surrounding an application region for the fill material on the first base member; and applying the fill material to the application region. The dam forming method according to the present technology includes: applying a dam-forming resin composition for forming the dam on peripheral edges of the first base member by accelerating the application speed of the dam-forming resin composition continuously or stepwise from the start to the end of the application; and curing the applied dam-forming resin composition.

Figure 1:
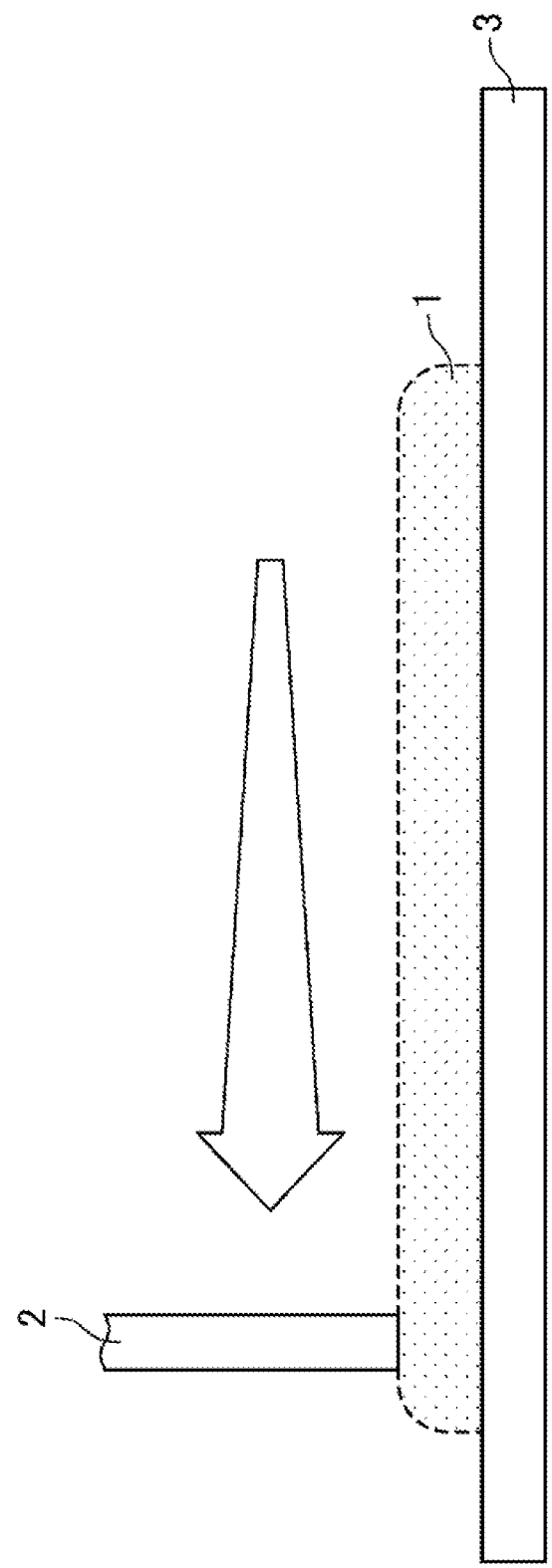
FIG. 1 is a plan view for explaining an example of a method for accelerating the application speed of a dam-forming resin composition continuously from the start to the end of the application.

FIG. 1 is a plan view for explaining an example of a method for accelerating the application speed of a dam-forming resin composition 1 continuously from the start to the end of the application. The arrow in FIG. 1 indicates the moving direction of a nozzle 2 of the application device, and the thicker the arrow, the faster the moving speed of the nozzle 2 (the application speed of the dam-forming resin composition 1). In this first mode of the dam forming method, as shown in FIG. 1, the application speed of the dam-forming resin composition 1 is continuously accelerated from the start to the end of the application. When continuously accelerating the application speed of the dam-forming resin composition 1, it is preferable that the application speed is gradually and continuously accelerated. Specifically, it is preferable to set the flow rate of the dam-forming resin composition 1 discharged from the nozzle 2 of the application device to be constant per unit time, to set the speed so that the application ending thickness (height) of the dam-forming resin composition 1 becomes the target dam thickness (height), and to set the application speed so as to reflect the ratio of the thickness (height) of the application starting position of the dam and the thickness (height) of the application ending position of the dam.

Figure 2:
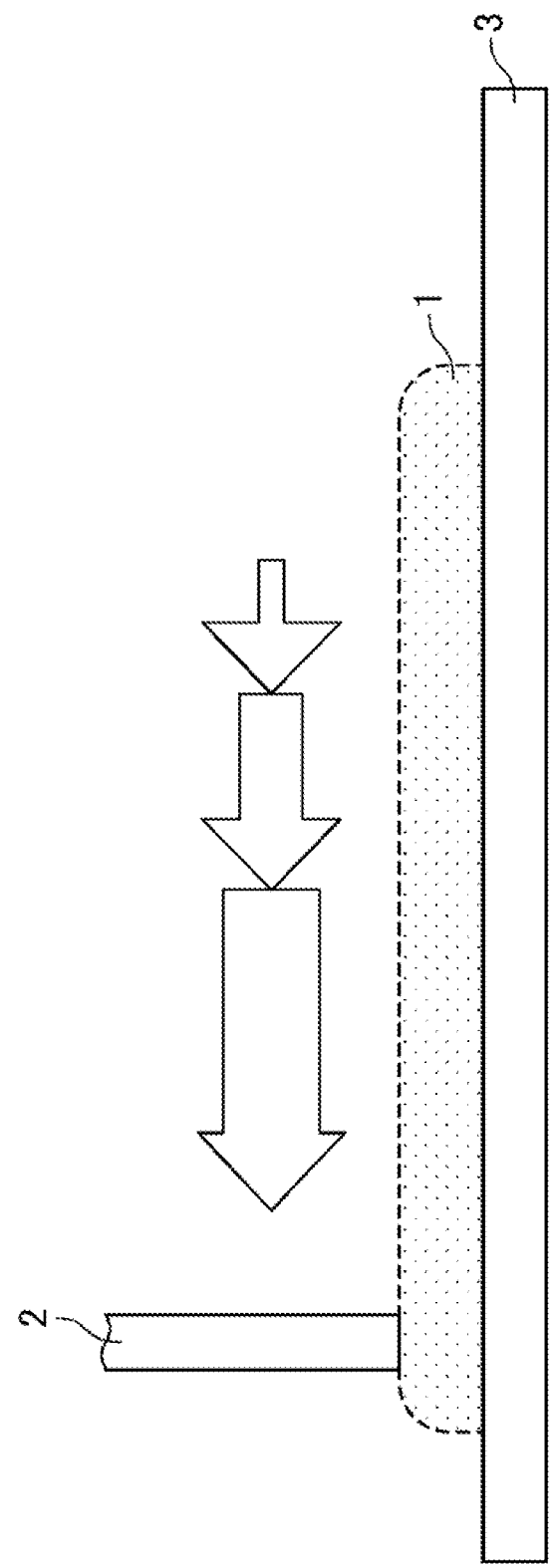
FIG. 2 is a plan view for explaining an example of a method for accelerating the application speed of a dam-forming resin composition stepwise from the start to the end of the application.

FIG. 2 is a plan view for explaining an example of a method for accelerating the application speed of the dam-forming resin composition 1 stepwise from the start to the end of the application. The arrow in FIG. 2 indicates the moving direction of the nozzle 2 of the application device, and the thicker the arrow, the faster the moving speed of the nozzle 2. In this second mode of the dam forming method, as shown in FIG. 2, the application speed of the dam-forming resin composition 1 is accelerated stepwise from the start to the end of the application. The stepwise acceleration of the application speed means, e.g., an acceleration of the moving speed of the nozzle 2 at every predetermined distance, and when a first base member 3 is rectangular and the dam-forming resin composition 1 is applied to the peripheral edges of the surface of the rectangular first base member 3, the application speed may be accelerated for each side of the first base member 3.

The dam-forming resin composition may be applied by various commonly used coating methods such as a method using a dispenser or a method using a coater.

Figure 3:
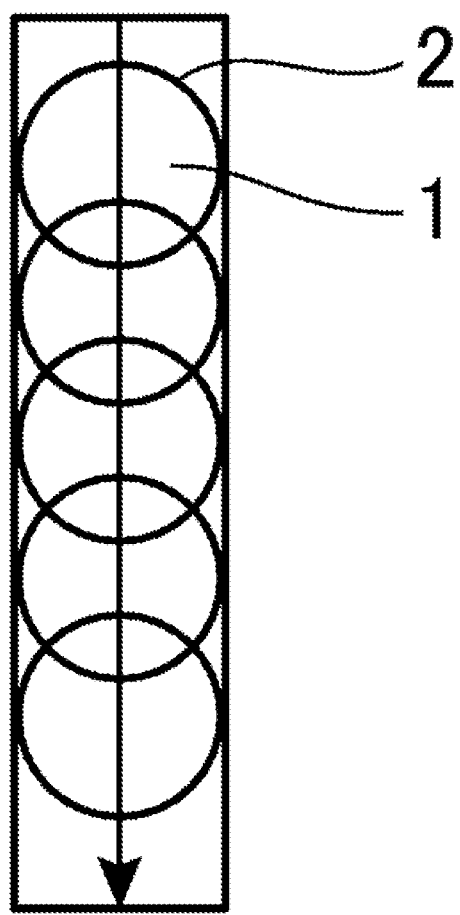
FIG. 3 is a plan view illustrating an example of moving positions of a nozzle when linearly applying the dam-forming resin composition.

FIG. 3 is a plan view illustrating an example of moving positions of the nozzle 2 when linearly applying the dam-forming resin composition 1. The arrow in FIG. 3 indicates the moving direction of the nozzle 2, and the circles represent the positions (in the application region) of the nozzle 2. In the dam forming method according to the present technology, for example, when linearly applying the dam-forming resin composition 1 from the nozzle 2, the position of the nozzle 2 is moved as indicated by the arrow in FIG. 3, and the flow rate of the dam-forming resin composition 1 discharged from the nozzle 2 per unit time is preferably made constant.

FIG. 4A is a plan view illustrating an example of moving positions of the nozzle 2 when the application direction of the dam-forming resin composition 1 is changed, and FIG. 4B is an enlarged plan view of the broken line box of FIG. 4A. In FIGS. 4A and 4B, the arrows indicate the moving direction of the nozzle 2, and the circles represent the positions of the nozzle 2. As shown in FIGS. 4A and 4B, when the application direction of the dam-forming resin composition 1 is changed at a right angle, it is preferable not to change the speed of the nozzle 2. The same applies when the application direction of the dam-forming resin composition 1 is changed in a curved manner. When the application direction of the dam-forming resin composition 1 is changed at a right angle, the dam-forming resin composition 1 applied to the corner part may swell. The inner diameter of the nozzle 2 and the application device influence this swelling. The influence of the inner diameter of the nozzle 2 is that, as shown in FIGS. 4A and 4B, an overlapping portion 5 occurs in the application region 4 of the dam-forming resin composition 1 to increase the amount of the dam-forming resin composition 1 applied per unit area in the overlapping portion 5, so that the dam-forming resin composition 1 spreads towards the outside of the application region 4. The influence of the application device is that, in some cases, the application device itself may shake under the influence of inertia when changing the application direction, and thus the dam-forming resin composition 1 is applied so as to swell towards the outside of the application region 4.

Figure 9:
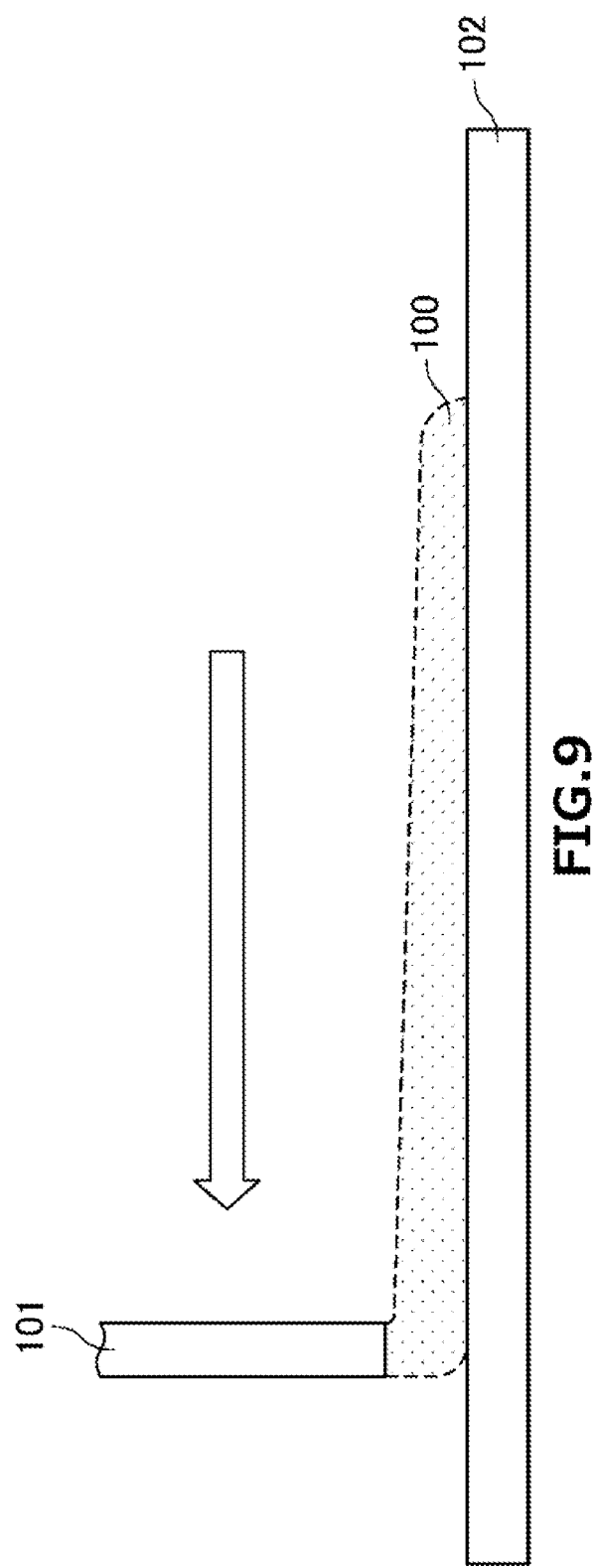
FIG. 9 is a cross-sectional view for explaining an example of a conventional dam forming method.
Figure 10:
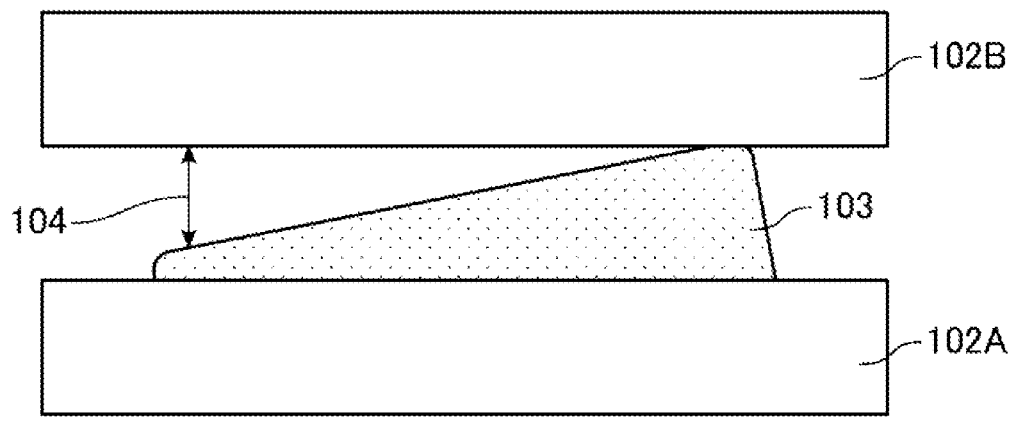
FIG. 10 is a cross-sectional view illustrating an example of a state in which an unbonded region occurs when base members are laminated to each other via a fill material as a result of a height difference in the thickness of a dam.
Figure 11:
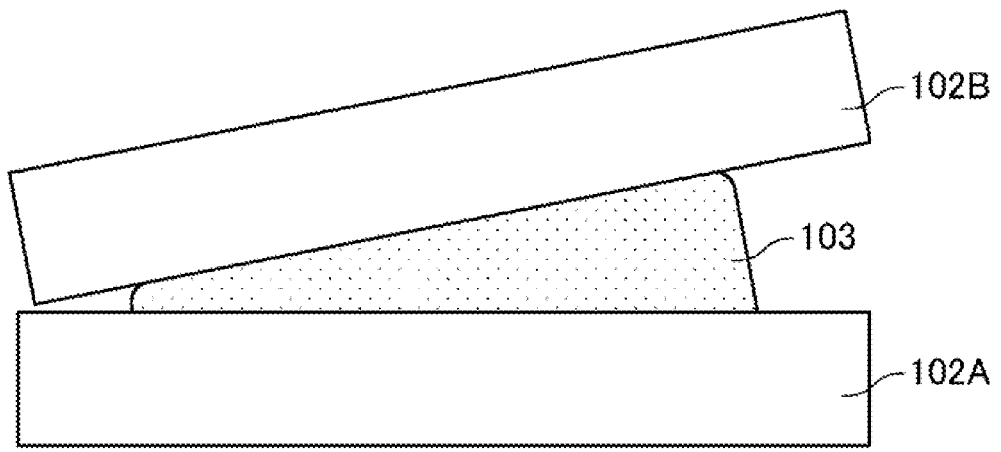
FIG. 11 is a cross-sectional view illustrating an example of a state in which the resin thickness becomes non-uniform after the base members are laminated to each other via a fill material as a result of a height difference in the thickness of a dam.
Figure 12:
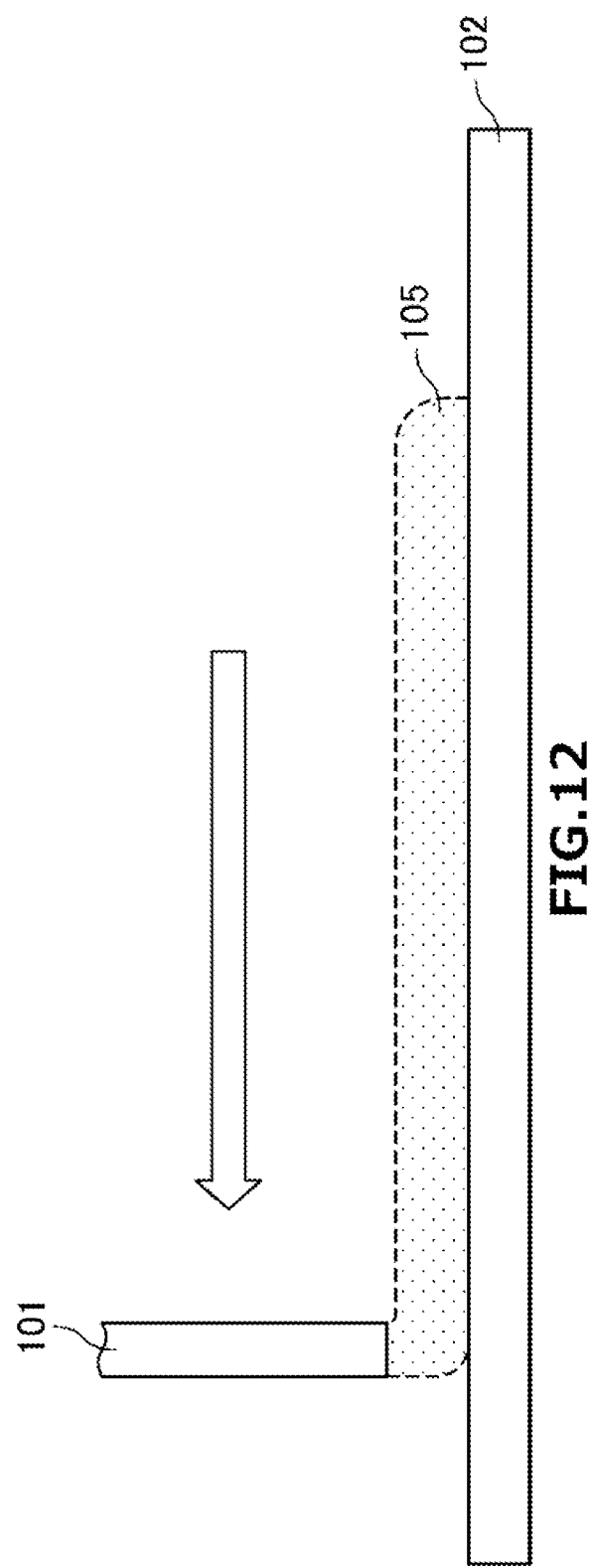
FIG. 12 is a cross-sectional view for explaining an example of a dam forming method using a thixotropic resin composition.
Figure 13:
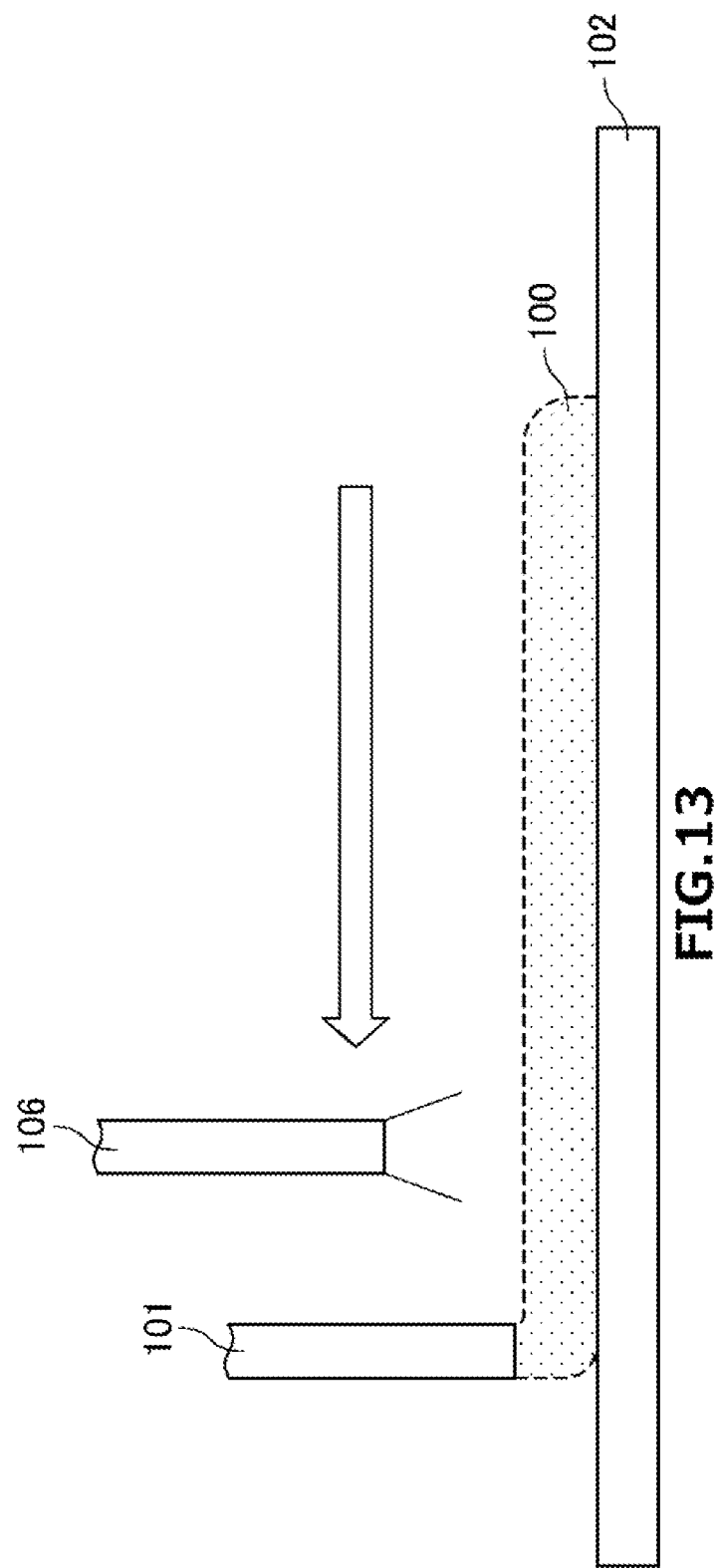
FIG. 13 is a cross-sectional view for explaining an example of a dam forming method using a spot UV irradiator.

FIG. 5 is a plan view for explaining an example of a method for accelerating the application speed of the dam-forming resin composition 1 continuously or stepwise from the start to the end of the application. When the application speed of the dam-forming resin composition 1 is accelerated continuously or stepwise from the start to the end of the application, as shown in FIG. 5, the width W1 of the dam-forming resin composition 1 on the application starting position tends to become wider than the width W2 on the application ending position. Even if the width W1 of the dam-forming resin composition 1 on the application starting position becomes wider than the width W2 on the application ending position, the dam forming method according to the present technology can suppress the height difference in the thickness of the dam by applying the dam-forming resin composition 1 by increasing the amount of the dam-forming resin composition 1 by considering the wetting and spreading with time. This is necessary because, as described above, if a height difference occurs in the dam, after laminating the base members to each other via the fill material, an unbonded region may occur as shown in FIG. 9, or the thickness of the fill material after laminating may become uneven as shown in FIG. 10. In order to avoid the occurrence of such an unbonded region or the non-uniform resin thickness after lamination, the dam forming method according to the present technology accelerates the application speed of the dam-forming resin composition 1 continuously or stepwise from the start to the end of the application to adjust the thickness of the dam to be uniform even if the width of the dam varies between the application starting position and the application ending position.

The dam forming method according to the present technology does not particularly limit the application speed of the dam-forming resin composition 1 because it depends on conditions such as the viscosity of the dam-forming resin composition 1, the size of the first base member 3, and the thickness of the dam, among others. As an example, when a photocurable resin composition having a viscosity of about 1 to 200 Pa*s is used as the dam-forming resin composition 1, the first base member 3 is a rectangular base member having a size of about 5 to 20 inches, and the thickness (height) of the dam is about 0.1 to 1.0 mm, the application speed of the dam-forming resin composition 1 can be set to 10 to 150 mm/sec. The viscosity of the dam-forming resin composition 1 is a value measured by a cone plate type viscometer at 25° C. With these conditions, for example, as shown in FIGS. 4A and 4B, when the application direction of the dam-forming resin composition 1 is changed without changing the speed of the nozzle 2, the dam-forming resin composition 1 can be prevented from swelling towards the outside of the application region 4.

The peripheral edges of the first base member 3 to which the dam-forming resin composition 1 is applied refers to the area located, e.g., 10 mm from the outer edge of the first base member 3. With regard to the curing method of the applied dam-forming resin composition 1, the dam-forming resin composition 1 can be cured by heat when using a thermal polymerization initiator, and the dam-forming resin composition 1 can be cured by light or electron beam irradiated from an active energy beam source when using a photopolymerization initiator. Examples of the active energy beam source include a high pressure mercury lamp, a low pressure mercury lamp, an electron beam irradiator, a halogen lamp, a light emitting diode, a semiconductor laser, and a metal halide lamp, among others. When using a photocurable resin composition containing a photopolymerization initiator as the dam-forming resin composition 1, the dam-forming resin composition 1 can be cured to form a dam by irradiating the dam-forming resin composition 1 applied to the first base member 3 with light (preferably ultraviolet light). Specific examples of the composition of the photocurable dam-forming resin composition include a composition containing a base component (e.g., an acrylate-based oligomer component), an acrylate-based monomer component, a plasticizer component, and a photopolymerization initiator.

As described above, the dam forming method according to the present technology accelerates the application speed of the dam-forming resin composition 1 continuously or stepwise from the start to the end of the application, thereby suppressing the decrease in the thickness of the dam caused by the wetting and spreading of the dam-forming resin composition 1 with time even when using a non-thixotropic resin composition. As described above, the dam forming method according to the present technology can reduce the height difference in the thickness of the dam, thereby preventing the occurrence of an unbonded region after lamination and/or a non-uniform resin thickness when the base members are laminated to each other via the fill material. Here, the non-thixotropic resin composition means a resin composition having no time dependence on viscosity and may include a resin composition satisfying the following Equation 1.

$$V_{1rpm}/V_{10rpm} = 1.0 \pm 0.01 \quad \text{(Equation 1)}$$

$V_{1rpm}$ in Equation 1 represents the viscosity of the dam-forming resin composition 1 at 25° C. measured by using a rotational viscometer at a rotational speed of 1 rpm. $V_{10rpm}$ in Equation 1 represents the viscosity of the dam-forming resin composition 1 at 25° C. measured by using a rotational viscometer at a rotational speed of 10 rpm.

More specifically, the viscosity in Equation 1 can be measured by "HAAKE RheoStress 600" manufactured by Thermo Electron Corporation as a rotational viscometer at a predetermined rotational speed and at 25° C., with a cone of $C35/2°$ for a viscosity range of 10 Pa*s or less of the dam-forming resin composition 1, and with a cone of C2½° for a viscosity range of more than 10 Pa*s of the dam-forming resin composition 1.

According to the present technology, the dam can be formed by using various resin compositions other than the thixotropic resin compositions. Further, the dam forming method according to the present technology, requiring no spot UV irradiator for performing simultaneous irradiation process, can reduce tact time as compared with the case employing the UV simultaneous irradiation process. Further, the dam forming method according to the present technology, requiring no thixotropic resin composition nor spot UV irradiator, can reduce the manufacturing cost.

The dam forming method according to the present technology can be used in a method for manufacturing a laminate in which a first base member and a second base member are laminated via a fill material, including: forming a dam surrounding an application region for the fill material on the first base member; and applying the fill material to the application region. As a specific example, the dam forming method can be used in a method for manufacturing an optical device in which the first base member is a transparent panel, and the second base member is an optical member.

The transparent panel may be one having light transmittance such that images displayed on the optical member can be visually recognized. Examples of the transparent panel include resin materials such as glass, acrylic resin, polyethylene terephthalate, polyethylene naphthalate, and polycarbonate. Examples of the shape of the transparent panel include a plate shape and a sheet shape. The transparent panel may be subjected to, e.g., a hard coat treatment or an antireflection treatment on at least one surface. The physical properties of the transparent panel such as shape, thickness, and elastic modulus can be appropriately selected according to the purpose of use. The transparent panel may be provided with a light shielding portion formed in a region corresponding to the peripheral edges of the display region of the optical member. The light shielding portion is provided for improving the contrast of the image. The light shielding portion can be formed, for example, by applying a paint colored in black by screen printing or the like, and then drying and curing the paint. The thickness of the light shielding portion can be suitably changed in accordance with the purpose, e.g., to 5 to 100 μm.

Examples of the optical member include a liquid crystal display panel, an organic EL display panel, a plasma display panel, and a touch panel. Here, the touch panel means an image display/input panel in which a display element such as a liquid crystal display panel and a position input device such as a touch pad are combined.

Method for Manufacturing a Laminate

Referring to FIGS. 6A to 6F, a method for manufacturing a laminate (optical device) will be explained which employs a dam forming method according to the present technology to manufacture a laminate in which a transparent panel as a first member and an optical member as a second member are laminated via a cured resin layer made of a fill material. A method for manufacturing a laminate includes Step A of forming a dam 7 surrounding an application region 6 for a fill material on a transparent panel 3A as shown in FIG. 6A, Step B of applying a fill material 8 to the application region 6 for the fill material as shown in FIG. 6B, Step C of laminating the transparent panel 3A and an optical member 9 via the fill material 8 as shown in FIG. 6C, and Step D of irradiating the fill material 8 with light as shown in FIG. 6E to form a cured resin layer 10 as shown in FIG. 6F.

Step A

Since Step A is the same as the above-described dam forming method, a detailed description thereof will be omitted.

Step B

In Step B, the fill material 8 is applied to the application region 6 for the fill material. Examples of the application method for the fill material 8 include a method of applying the fill material 8 by using a slit nozzle or a multi-nozzle having a narrow pitch (for example, 1 to 2 mm) to spread the fill material 8 uniformly over the entire surface of the application region 6 for the fill material, and a method of applying the fill material 8 having a low viscosity and rapid wetting and spreading property by using a dispenser in a rough pattern. As the fill material 8, for example, a resin composition having the same component as the above-mentioned dam-forming resin composition 1 can be used.

Step C

In Step C, the transparent panel 3A and the optical member 9 are laminated together via the fill material 8. In Step C, for example, the transparent panel 3A and the optical member 9 are laminated together via the fill material 8 under a reduced pressure lower than the atmospheric pressure. This Step C forms a laminate in which the transparent panel 3A, the layer of the fill material 8, and the optical member 9 are laminated in this order.

Step D

In Step D, the fill material 8 is irradiated with light to form the cured resin layer 10, thereby completing an optical device 11 (see FIG. 6F) in which the transparent panel 3A and the optical member 9 are laminated via the cured resin layer 10.

In Step D, the fill material 8 of the laminate obtained in Step C is irradiated with light to cure the fill material 8. In Step D, for example, the cured resin layer 10 is formed by irradiating the fill material 8 held between the optical member 9 and the transparent panel 3A with ultraviolet rays (UV) from the transparent panel 3A side using an ultraviolet irradiator. The light irradiation in Step D is performed so that the curing rate (gel fraction) of the cured resin layer 10 is preferably 90% or more, more preferably 95% or more. The refractive index of the cured resin layer 10 is preferably substantially equal to that of the transparent panel 3A or the optical member 9, and can be, for example, 1.45 to 1.55. This enhances the luminance and contrast of the image light to improve visibility. The light transmittance of the cured resin layer 10 preferably exceeds 90%. This improves the visibility of images. The thickness of the cured resin layer 10 can be appropriately selected according to the purpose, and can be, for example, 50 to 200 μm.

The method for manufacturing a laminate is not limited to the above example, and may further include other steps. For example, as shown in FIG. 6D, the method for manufacturing a laminate may further include, between Step C and Step D, a step of removing bubbles in the fill material 8 by pressurizing the laminate obtained in Step C with an autoclave 13.

EXAMPLES

Examples of the present technology will be described below. The present technology is not limited to the following examples. In the present examples, by using a non-thixotropic photocurable resin composition (a dam-forming resin composition satisfying Equation 1), the thickness and the width of the dam were compared between a case of accelerating the application speed of the dam-forming resin composition continuously or stepwise from the start to the end of the application, and a case of keeping the application speed of the dam-forming resin composition constant.

The present examples used, as the dam-forming resin composition, an ultraviolet curable resin composition containing an acrylate-based oligomer component, an acrylate-based monomer component, a plasticizer component, and a photopolymerization initiator, having a viscosity of 100 Pa*s and satisfying the above Equation 1.

Example 1

In Example 1, a dam-forming resin composition was applied to the periphery of the surface of a rectangular base member 12 (size: 23 cm×18 cm) in a frame shape having a thickness (height) of about 400 μm, a width of 1200 to 1500 μm, and a length of 800 mm. In Example 1, as shown in FIG. 7, the application speed of the dam-forming resin composition was continuously accelerated from 45 mm/sec to 50 mm/sec from the start to the end of the application. The arrows in FIG. 7 indicate the direction of application of the dam-forming resin composition. The black triangle symbols in FIG. 7 represents positions (points) at which the thickness and width of the dam were measured. The measurement results of the thickness and width of the dam are shown in Table 1.

TABLE 1

|  | P7 | | P8 | |
| --- | --- | --- | --- | --- |
| point number | thickness [μm] | width [μm] | thickness [μm] | width [μm] |
| 1 | 394 | 1490 | 399 | 1504 |
| 2 | 392 | 1400 | 397 | 1414 |
| 3 | 393 | 1341 | 398 | 1377 |
| 4 | 395 | 1316 | 397 | 1329 |
| 5 | 401 | 1293 | 402 | 1286 |
| 6 | 399 | 1235 | 403 | 1214 |

Figure 8:
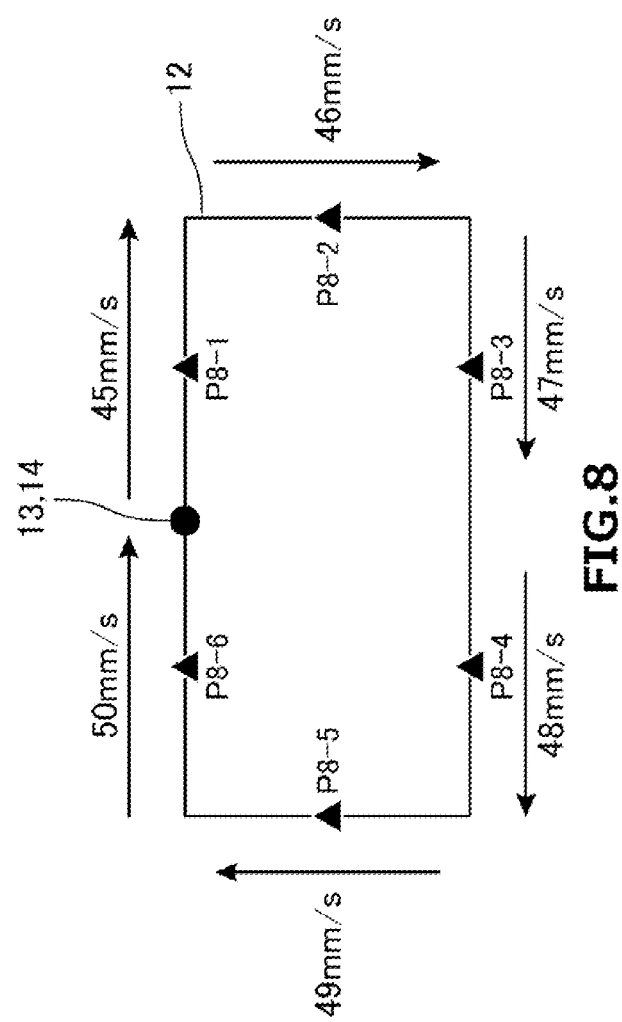
FIG. 8 is a plan view for explaining the dam forming method in Example 2.

In Table 1, "P7" represents the respective positions P7-1 to P7-6 in FIG. 7, and "P8" represents the respective positions P8-1 to P8-6 in FIG. 8. In Table 1, "point number" represents the final number (1 to 6) of P7-1 to P7-6 in FIG. 7 and the final number (1 to 6) of P8-1 to P8-6 in FIG. 8. In Table 1, "thickness" represents the thickness (height) of the dam applied to the peripheral edge of the surface of the base member 12, and "width" represents the width of the dam applied to the peripheral edge of the surface of the base member 12. For example, the values "394" and "1449" in the cells where "P7" and "point number 1" intersect in Table 1 indicate that the thickness of the dam at the position of P7-1 in FIG. 7 is 394 μm and the width of the dam at the position of P7-1 in FIG. 7 is 1490 μm.

In Example 1, comparison revealed that there were almost no change between the thickness (height) of the dam at an application starting position 13 (the position of P7-1 in FIG. 7) and that at an application ending position 14 (the position of P7-6 in FIG. 7).

Example 2

In Example 2, application was conducted in the same manner as Example 1 except that the application speed of the dam-forming resin composition was accelerated stepwise from the start to the end of the application: 45 mm/sec, 46 mm/sec, 47 mm/sec, 48 mm/sec, 49 mm/sec, and 50 mm/sec as shown in FIG. 8. The arrows in FIG. 8 indicate the direction of application of the dam-forming resin composition. The measurement results of the thickness and width of the dam are shown in Table 1. In Example 2, comparison revealed that there was almost no change between the thickness of the dam on the application starting position 13 side (the position of P8-1 in FIG. 8) and the thickness of the dam on the application ending position 14 side (the position of P8-6 in FIG. 8).

Example 3

In Example 3, application was conducted in the same manner as Example 1 except that the application speed of the dam-forming resin composition was kept constant at 50 mm/sec from the start to the end of the application. With regard to Example 3, the results of comparing the thickness of the dam and the width of the dam at the start to the end of the application are shown in Table 2.

TABLE 2

|  |  | ending position | starting position | increase/decrease ratio |
| --- | --- | --- | --- | --- |
| about 350 μm | thickness [μm] | 368 | 340 | −8% |
|  | width [μm] | 1222 | 1236 | 1% |
| about 450 μm | thickness [μm] | 447 | 386 | −14% |
|  | width [μm] | 1287 | 1304 | 1% |
| about 65 μm | thickness [μm] | 651 | 552 | −15% |
|  | width [μm] | 1677 | 1733 | 3% |
| about 700 μm | thickness [μm] | 709 | 597 | −16% |
|  | width [μm]] | 1799 | 1856 | 3% |

For example, "about 350 μm" in the left-most column in Table 2 indicates that the thickness of the dam was set to about 350 μm. The "thickness" in the second column from the left in Table 2 represents the thickness (height) of the dam applied to the peripheral edge of the surface of the base member 12, and the "width" represents the width of the dam applied to the peripheral edge of the surface of the base member 12. The "ending position" in the third column from the left in Table 2 represents the measured values of the thickness (μm) and the width (μm) of the dam at the application ending position 14 (immediately after application). The "starting position" in the fourth column from the left in Table 2 represents the measured values of the thickness (μm) and the width (μm) of the dam of the application starting position 13. The "increase/decrease ratio" in the right-most column In Table 2 represents the ratio of the thickness (μm) of the dam at the application ending position 14 and the application starting position 13 (application starting position/application ending position) and the ratio of the width (μm) of the dam at the application ending position 14 and the application starting position 13 (application starting position/application ending position).

In Example 3, as shown in Table 2, when a dam having a thickness of 350 to 700 μm was formed, the thickness of the dam at the application ending position 14 decreased by about 8 to 16% as compared with the thickness of the dam at the application starting position 13. Further, in Example 3, when a dam having a thickness of 350 to 700 μm was formed, the width of the dam at the application ending position 14 increased by about 1 to 3% as compared with the width of the dam at the application starting position 13. Further, the result of Example 3 revealed that increasing the thickness of the dam also increases the height difference in the thickness of the dam between the application starting position 13 and the application ending position 14.

The results of Examples 1 to 3 show that when applying the dam-forming resin composition to the peripheral edge portion of the surface of the base member, accelerating the application speed of the dam-forming resin composition continuously or stepwise from the start of application to the end of application can suppress the occurrence of a height difference in the thickness of the dam.

REFERENCE SIGNS LIST 1 dam-forming resin composition, 2 nozzle, 3 first base member, 3A transparent panel, 3B light shielding portion, 4 application region for dam-forming resin composition, 5 overlapping portion of application region, 6 application region for fill material, 7 dam, 8 fill material, 9 optical member, 10 cured resin layer, 11 laminate, 12 base member, 13 autoclave, 100 dam-forming resin composition, 101 nozzle, 102 base member, 103 fill material, 104 unbonded region, 105 thixotropic resin composition, 106 spot UV irradiator

The invention claimed is:

1. A dam forming method used in a method for manufacturing a laminate in which a first base member and a second base member are laminated via a fill material, including: forming a dam surrounding an application region for the fill material on the first base member; and applying the fill material to the application region, the dam forming method comprising:
applying a dam-forming resin composition for forming the dam on peripheral edges only of the first base member by accelerating the application speed of the dam-forming resin composition continuously or stepwise from the start to the end of the application; and
curing the applied dam-forming resin composition.

2. The dam forming method according to claim 1, wherein the dam-forming resin composition satisfies Equation 1:

$$V_{1rpm}/V_{10rpm}=1.0\pm0.01 \quad \text{(Equation 1)},$$

wherein $V_{1rpm}$ in Equation 1 represents the viscosity of the dam-forming resin composition at 25° C. measured by using a rotational viscometer at a rotational speed of 1 rpm, and $V_{10rpm}$ in Equation 1 represents the viscosity of the dam-forming resin composition at 25° C. measured by using a rotational viscometer at a rotational speed of 10 rpm.

3. The dam forming method according to claim 1, wherein the dam-forming resin composition has a viscosity of 1 to 200 Pa*s.

4. The dam forming method according to claim 1, wherein the height of the dam is 0.1 to 1.0 mm.

5. The dam forming method according to claim 1, wherein the application speed of the dam-forming resin composition is 10 to 150 mm/sec.

6. The dam forming method according to claim 1,
wherein the dam-forming resin composition is a photocurable resin composition, and
wherein the dam-forming resin composition applied to the first base member is cured by light irradiation.

7. The dam forming method according to claim 1, wherein the first base member is a transparent panel, wherein the second base member is an optical member, and
wherein the laminate is an optical device.

8. A method for manufacturing a laminate, comprising:
Step A of forming a dam surrounding an application region for a fill material on a first base member;
Step B of applying the fill material to the application region;
Step C of laminating the first base member and the second base member via the fill material; and
Step D of forming a cured resin layer by curing the fill material,
wherein the dam is formed in Step A by applying a dam-forming resin composition for forming the dam on peripheral edges only of the first base member by accelerating the application speed of the dam-forming resin composition continuously or stepwise from the start to the end of the application, and curing the applied dam-forming resin composition.

9. The dam forming method according to claim 2, wherein the dam-forming resin composition has a viscosity of 1 to 200 Pa*s.

10. The dam forming method according to claim 2, wherein the height of the dam is 0.1 to 1.0 mm.

11. The dam forming method according to claim 3, wherein the height of the dam is 0.1 to 1.0 mm.

12. The dam forming method according to claim 2, wherein the application speed of the dam-forming resin composition is 10 to 150 mm/sec.

13. The dam forming method according to claim 3, wherein the application speed of the dam-forming resin composition is 10 to 150 mm/sec.

14. The dam forming method according to claim 4, wherein the application speed of the dam-forming resin composition is 10 to 150 mm/sec.

15. The dam forming method according to claim 2,
wherein the dam-forming resin composition is a photocurable resin composition, and
wherein the dam-forming resin composition applied to the first base member is cured by light irradiation.

16. The dam forming method according to claim 3,
wherein the dam-forming resin composition is a photocurable resin composition, and
wherein the dam-forming resin composition applied to the first base member is cured by light irradiation.

17. The dam forming method according to claim 4,
wherein the dam-forming resin composition is a photocurable resin composition, and
wherein the dam-forming resin composition applied to the first base member is cured by light irradiation.

18. The dam forming method according to claim 5,
wherein the dam-forming resin composition is a photocurable resin composition, and
wherein the dam-forming resin composition applied to the first base member is cured by light irradiation.

19. The dam forming method according to claim 2,
wherein the first base member is a transparent panel,
wherein the second base member is an optical member, and
wherein the laminate is an optical device.

20. The dam forming method according to claim 3,
wherein the first base member is a transparent panel,
wherein the second base member is an optical member, and
wherein the laminate is an optical device.

* * * * *